United States Patent
Cui et al.

(10) Patent No.: US 10,136,363 B2
(45) Date of Patent: *Nov. 20, 2018

(54) FACILITATION OF MOBILITY MANAGEMENT ACROSS VARIOUS RADIO TECHNOLOGIES

(71) Applicant: AT&T Intellectual Property I, L.P., Atlanta, GA (US)

(72) Inventors: Zhi Cui, Sugar Hill, GA (US); Liza Fung, Edison, NJ (US); Cheng Liu, Brookhaven, GA (US); Vinod Pandey, Eden Prairie, MN (US); Paul Edward Smith, Jr., Rockwall, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/803,195

(22) Filed: Nov. 3, 2017

(65) Prior Publication Data
US 2018/0054763 A1    Feb. 22, 2018

Related U.S. Application Data

(63) Continuation of application No. 14/500,518, filed on Sep. 29, 2014, now Pat. No. 9,826,436.

(51) Int. Cl.
*H04W 36/00*    (2009.01)
*H04W 4/02*    (2018.01)
(Continued)

(52) U.S. Cl.
CPC .......... *H04W 36/0011* (2013.01); *H04W 4/02* (2013.01); *H04L 45/64* (2013.01); *H04W 84/042* (2013.01)

(58) Field of Classification Search
None
See application file for complete search history.

(56) References Cited

U.S. PATENT DOCUMENTS

| 7,245,918 B2 | 7/2007 | Nikkelen et al. |
| 7,251,228 B2 | 7/2007 | Knisely et al. |
| (Continued) | | |

FOREIGN PATENT DOCUMENTS

| EP | 1 096 823 A2 | 5/2001 |
| EP | 1 125 456 A1 | 8/2001 |
| (Continued) | | |

OTHER PUBLICATIONS

Wang et al., "A Solution for IP Mobility Support in Software Defined Networks," 23rd International Conference on Computer Communication and Networks (ICCCN), 2014, pp. 481-488, IEEE, 8 pages.

(Continued)

*Primary Examiner* — Ayaz R Sheikh
*Assistant Examiner* — Tarell A Hampton
(74) *Attorney, Agent, or Firm* — Amin, Turocy & Watson, LLP

(57) ABSTRACT

A more efficient network can be achieved using software-defined networking to configure routing tables to route data traffic to and from proper cells. User equipment address data and network device internet protocol address data can be utilized to define locators specific to a user equipment device in relation to various network devices. For instance, broadcasted network address data representative of a mobile device identifier address can be received by a first network device from the mobile device, wherein the mobile device identifier address comprises network address data related to an internet protocol address of a second network device, the first network device can determine a third network device (Continued)

capable of a communication with the mobile device, and the communication with the mobile device can be routed by the first network device to the third network device.

20 Claims, 12 Drawing Sheets

(51) Int. Cl.
*H04W 84/04* (2009.01)
*H04L 12/715* (2013.01)

(56) References Cited

U.S. PATENT DOCUMENTS

| | | |
|---|---|---|
| 8,457,635 B2 | 6/2013 | Bachmann et al. |
| 8,498,237 B2 | 7/2013 | Corson et al. |
| 8,537,855 B2 | 9/2013 | Wieslawa |
| 8,553,650 B2 | 10/2013 | Veres et al. |
| 8,717,983 B2 | 5/2014 | Wei et al. |
| 8,873,398 B2 * | 10/2014 | Kempf .................. H04W 24/02 370/216 |
| 2005/0128969 A1 | 6/2005 | Lee et al. |
| 2010/0159927 A1 | 6/2010 | Toda et al. |
| 2010/0175109 A1 | 7/2010 | Haddad |
| 2010/0202407 A1 | 8/2010 | Edge |
| 2011/0286324 A1 * | 11/2011 | Bellagamba ........ H04L 41/0677 370/219 |
| 2012/0014308 A1 | 1/2012 | Li et al. |
| 2012/0300615 A1 * | 11/2012 | Kempf .................. H04W 24/02 370/216 |
| 2013/0054761 A1 | 2/2013 | Kempf et al. |
| 2013/0183977 A1 | 7/2013 | Han et al. |
| 2014/0112139 A1 | 4/2014 | Allan et al. |
| 2014/0115135 A1 | 4/2014 | Allan et al. |
| 2014/0126410 A1 | 5/2014 | Agarwal et al. |
| 2014/0189074 A1 * | 7/2014 | Parker .................... H04L 63/20 709/220 |
| 2014/0189160 A1 | 7/2014 | Haddad et al. |
| 2014/0192781 A1 | 7/2014 | Teyeb et al. |
| 2014/0204746 A1 | 7/2014 | Sun et al. |
| 2014/0254373 A1 | 9/2014 | Varma |
| 2014/0269535 A1 | 9/2014 | Pazhyannur et al. |
| 2014/0362790 A1 | 12/2014 | McCann |
| 2015/0055623 A1 | 2/2015 | Li et al. |
| 2015/0156122 A1 | 6/2015 | Singh et al. |
| 2015/0245392 A1 | 8/2015 | Chan et al. |
| 2015/0271710 A1 | 9/2015 | Zhang et al. |

FOREIGN PATENT DOCUMENTS

| | | |
|---|---|---|
| EP | 1 125 458 A1 | 8/2001 |
| EP | 1 159 849 A1 | 12/2001 |
| EP | 1 566 983 A2 | 8/2005 |
| EP | 2 355 594 A1 | 8/2011 |
| WO | 95/26094 A1 | 9/1995 |
| WO | 2010/027569 A1 | 3/2010 |
| WO | 2011/023234 A1 | 3/2011 |
| WO | 2012/114154 A1 | 8/2012 |

OTHER PUBLICATIONS

Yoon, "A Study of Network Assisted Handover Mechanism based on the Terminal Mobility in Wireless ATM Network," A Thesis for the Degree of Master, 2000, 84 pages, School of Engineering Information and Communications University, Korea, Retrieved on Aug. 13, 2014.

Blomqvist, "An Implementation of Mobile IPv6 Over the VDL Mode 4 Data Link for Civil Aviation," Jun. 16, 2010, 57 pages, Linköpings universitet, Sweden, Retrieved on Aug. 13, 2014.

Dini, et al., "On the Interworking Among Heterogeneous Wireless Networks for Seamless User Mobility," 2007, 7 pages, IEEE Buran, Spain, Retrieved on Aug. 13, 2014.

Marquez-Barja, et al., "Performance Analysis of an IEEE 802.21 based Vertical Handover protocol using ns-2," 6 pages, Universitat Politecnica de Valencia, Retrieved on Aug. 13, 2014.

Melia, et al., "The Daidalos Architecture for Mobility and QoS," 8 pages, Retrieved on Aug. 13, 2014.

Wetterwald, et al., "Enabling IEEE 802.21 in a B3G Cellular Experimental Network.," 8 pages, Retrieved on Aug. 13, 2014.

Office Action for U.S. Appl. No. 14/500,518 dated Feb. 16, 2016, 34 pages.

Office Action for U.S. Appl. No. 14/500,518 dated Aug. 23, 2016, 36 pages.

Office Action for U.S. Appl. No. 14/500,518 dated Jan. 26, 2017, 33 pages.

\* cited by examiner

FACILITATION OF MOBILITY MANAGEMENT ACROSS VARIOUS RADIO TECHNOLOGIES

RELATED APPLICATION

This patent application is a continuation of, and claims priority to, U.S. patent application Ser. No. 14/500,518 (now U.S. Pat. No. 9,826,436), filed Sep. 29, 2014, and entitled "FACILITATION OF MOBILITY MANAGEMENT ACROSS VARIOUS RADIO TECHNOLOGIES," the entirety of which application is hereby incorporated by reference herein.

TECHNICAL FIELD

This disclosure relates generally to facilitating seamless handoff of communication between mobile devices and network devices.

BACKGROUND

Software-defined networking (SDN) and a standard based identifier/locator network protocol (ILNP) can be used to simplify mobility management. SDN is an approach to computer networking that allows network administrators to manage network services through abstraction of lower level functionality. This can be accomplished by decoupling the system that makes decisions about where traffic is sent (the control plane) from the underlying systems that forward the traffic to the selected destination (the data plane). ILNP is a network protocol designed to separate the two functions of network addresses, the identification of network endpoints, and assisting routing by separating topological information from node identity information. ILNP is also backwards-compatible with existing internet protocol (IP), and is incrementally-deployable.

SDN and standard based ILNP can be used instead of general packet radio service (GPRS) tunneling protocols (GTP) across radio access networks (RAN) and various types of gateways for different radio access technologies. GTP is a group of IP-based communications protocols used to carry general packet radio service (GPRS) within a global system for mobile communications (GSM), universal mobile telecommunications system (UMTS) and long term evolution (LTE) networks.

The above-described background relating to a mobility management mechanisms is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
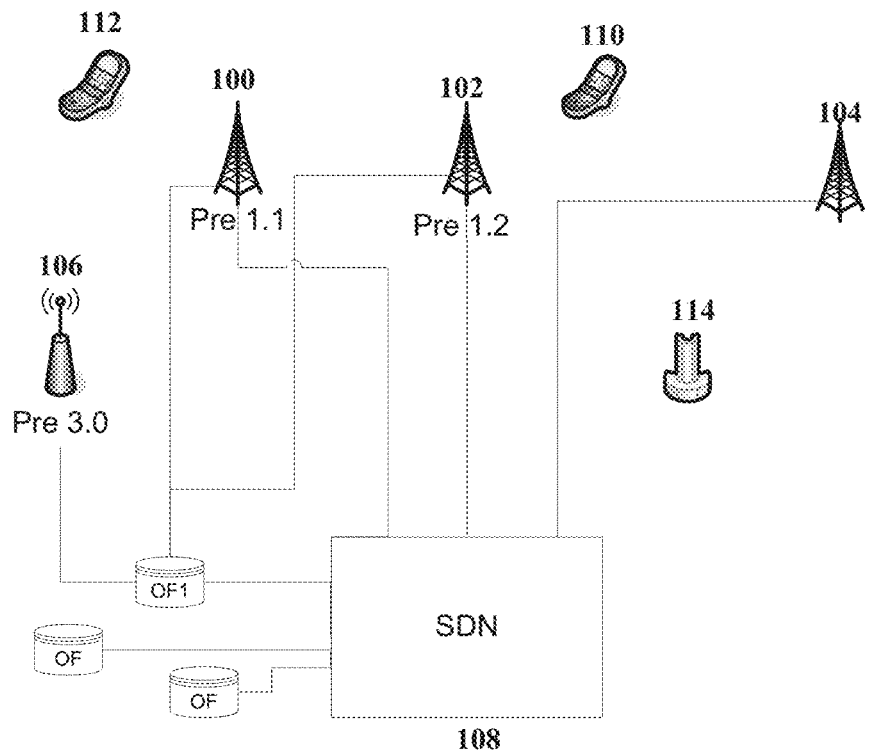
FIG. 1 illustrates a wireless network comprising an SDN and multiple user equipment according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview of the various embodiments presented herein, to correct for the above-identified deficiencies and other drawbacks of traditional cellular mobility management, various embodiments are described herein to facilitate a seamless handoff of communication between mobile devices and network devices.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium) to facilitate transporting and transferring such methodologies to computers. The term article of manufacture, as used herein, is intended to encompass a computer program accessible from any computer-readable device, carrier, or media, including a non-transitory computer readable storage medium.

Described herein are systems, methods, articles of manufacture, and other embodiments or implementations that can facilitate handoff (HO) of communication between mobile devices and network devices. Facilitating use of an SDN to manage a communications network can be implemented in connection with any type of device with a connection to the communications network such as: a mobile handset, a computer, a handheld device, or the like.

Mobility management using SDN and ILNP protocol across various wireless technologies (e.g. LTE, Wi-Fi, any future 5G access technologies) will be necessary to keep up with the increase in mobile device traffic. In addition, the variation of different types of end points, the variation of applications, and the variation of mobility states of user equipment (UE) (whether a device is moving, and how fast) is growing. Cellular mobility management systems that treat all end points the same will no longer be cost effective in a new paradigm with tens of billions of mobile-to-mobile (M2M) end points.

An SDN-based mobility management mechanism using ILNP can enable common mobility management across many wireless technologies. Network (Site) mobility comprising a whole site or one or more IP subnets may be mobile, moving across administrative boundaries or topological boundaries within an IP-based network, or moving across the internet. The site as a whole needs to maintain consistency in connectivity. ILNP can deal with mobile networks similarly to site multi-homing where the management of site mobility is delegated to each host in the site (so the hosts need to be ILNP-capable).

Leveraging SDN, decoupling the control plane from the data forwarding plane, and using standard based ILNP can simplify the mobility management process and also minimize states maintained in the network based on UE types. The SDN can relay according to an openflow communications protocol to give access to the forwarding plane of a network switch/router over the network. This can allow service providers to manage network services through abstraction of lower level functionality. The aforementioned system can reduce the cost of network equipment, UE, and improve upgradability due to a software driven approach. Furthermore, SDN-based mobility management can reduce UE complexity and improve UE battery life by using a simple IP instead of using special purpose tunnels/bearers.

An SDN mobility management system can comprise UE, network devices (such as cellular towers/cells and/or Wi-Fi access points), and SDNs. The cells and Wi-Fi access points can be controlled by an SDN controller. Different cells and Wi-Fi access points can all have different IP prefixes (i.e.: 1.1., 1.2., 3.0.). In one scenario intra-cellular HO can occur when the UE is moving away from one cell and towards another cell. In another scenario, cellular to access point HO can occur when the UE is moving away from the cell and towards a Wi-Fi access point. In an additional scenario, Wi-Fi to cellular HO can occur when the UE is moving away from the Wi-Fi access point towards the cell. To communicate with the UE, the cells and the Wi-Fi access points can broadcast their IP prefixes (locator address) to the UE. The communications protocol address can be either an IPv6 address or an IPv4 address. Other IP-based mobility protocols such as multi-path transmission control protocol can also leverage this process.

A network device can broadcast one or more locator addresses and a UE can receive the one or more locator addresses from the network device and append its own UE identifier address (e.g. lower 64 bits) to form one or multiple IP addresses. Although the UE identifier stays the same, the locator addresses will change as the UE moves through the network. The number of formed IP address can depend on the number of received prefixes from cells or access point devices. Distributed SDN controllers associated with the network devices can perform mobility management functions including, hut not limited to, the following functions: initiating a soft HO option, dynamically configuring a switching/routing table, and/or maintaining a forwarding table.

The UE can initiate two types of HO options as soon as HO thresholds are met: an immediate HO or a soft HO. During an immediate HO the UE sends a locator update message to corresponding nodes (CN) (i.e.: website, mobile device, etc.), immediately stops using a locator address for a serving node (i.e.: cellular tower, Wi-Fi access point, etc.), and switches to using another locator address for a target node only. The CN is the receiver of communication from the UE. During the soft HO option, the UE can send a locator update message to a CN and send the locator update to a domain name system (DNS) server after the HO. The UE can use the locator address for the serving node and the other locator address for the target node until: 1) it no longer receives incoming packets with the locator address for the serving node after a certain time; and/or 2) it no longer hears a receiving address (RA), comprising locator address data, for the serving node from the source network device.

The SDN controller associated with respective networking devices can configure switching/routing tables of the switch/router component in order to route data traffic to/from the proper network devices corresponding to the locator address for the serving node and the locator address for the target node. The SDN controller can also maintain a UE information table. Maintenance of the UE information table can include, but is not limited to: adding UE data, removing UE data, updating UE data, updating UE location data, updating a mobility status, updating candidate IP addresses associated with current or past serving network devices, and/or updating active IP addresses. The mobility status can be representative of how fast a UE device is moving relative to the network devices. For instance, the UE device can be static, moving at pedestrian speed, or the speed of a vehicle, etc. In the case that multiple connectivity (e.g. dual connectivity's, Wi-Fi/cellular integration inter-system routing policy (ISRP), MP-TCP, etc.) is desired for the UE, there can be multiple active IP addresses.

In one embodiment, described herein is a method comprising receiving broadcasted network address data of a mobile device identifier address comprising network address data related to an IP address of another network device. A first network device can then determine a third network device for routing communication and route communication from the mobile device to the third network device.

According to another embodiment, a system can facilitate, the receiving mobile device broadcasted network address data comprising IP network address data of another network device, and receiving IP address data related to a third network device. The system can also facilitate the determining of a condition related to a HO between the mobile device and the third network device. Furthermore, the system can facilitate the terminating of communication between the other network device in response to a condition being satisfied.

According to yet another embodiment, described herein is a computer readable medium that can perform the operations comprising receiving mobile device broadcasted network address data comprising IP network address data of another network device, and receiving IP address data related to a third network device. The computer readable medium can also facilitate the generating of a HO condition related to a range between the mobile device and network devices. Additionally, the computer readable medium can perform the operations comprising initiating another communication between the other network device and the mobile device in response to the HO condition being satisfied.

These and other embodiments or implementations are described in more detail below with reference to the drawings.

Referring now to FIG. 1, illustrated is wireless network comprising an SDN and UE devices. UE devices 110, 112, 114 can include, but are not limited to, a meter reader, a mobile device, a tablet, etc. UE devices 110, 112, 114 can also be stationary or mobile and require mobility HO. In a cellular network, multiple network devices can exist including, but not limited to, cellular towers 100, 102, 104 and Wi-Fi access points 106 that can communicate with the UE devices 110, 112, 114.

Identification data can be sent from the cellular towers 100, 102, 104 and the Wi-Fi access point devices 106 to the UE devices 110, 112, 114. This identification data can include various IP prefixes corresponding to each cellular tower 100, 102, 104 and/or Wi-Fi the access point device 106. For instance, as indicated by FIG. 1, the cellular tower 100 can send a prefix 1.1, the cellular tower 102 can send a prefix 1.2, and the Wi-Fi access point device 106 can send a prefix 3.0. After the cellular towers or Wi-Fi access points have sent their respective identification data to the UE device, the UE device can then append its own UE identifier address and create one or more new identifier addresses associated with each cellular tower or Wi-Fi access point for which it received identification data.

The new identifier address can then be forwarded to the SDN 108 for configuration of a forwarding table. Each SDN can be associated with a network device or a set of network devices. The SDN can facilitate session continuity by performing an immediate 140 or soft HO between one network device and another network device. During the soft HO, the UE device 110, 112, 114 can have multiple IP addresses (locators), which can be sent to CNs.

Figure 2:
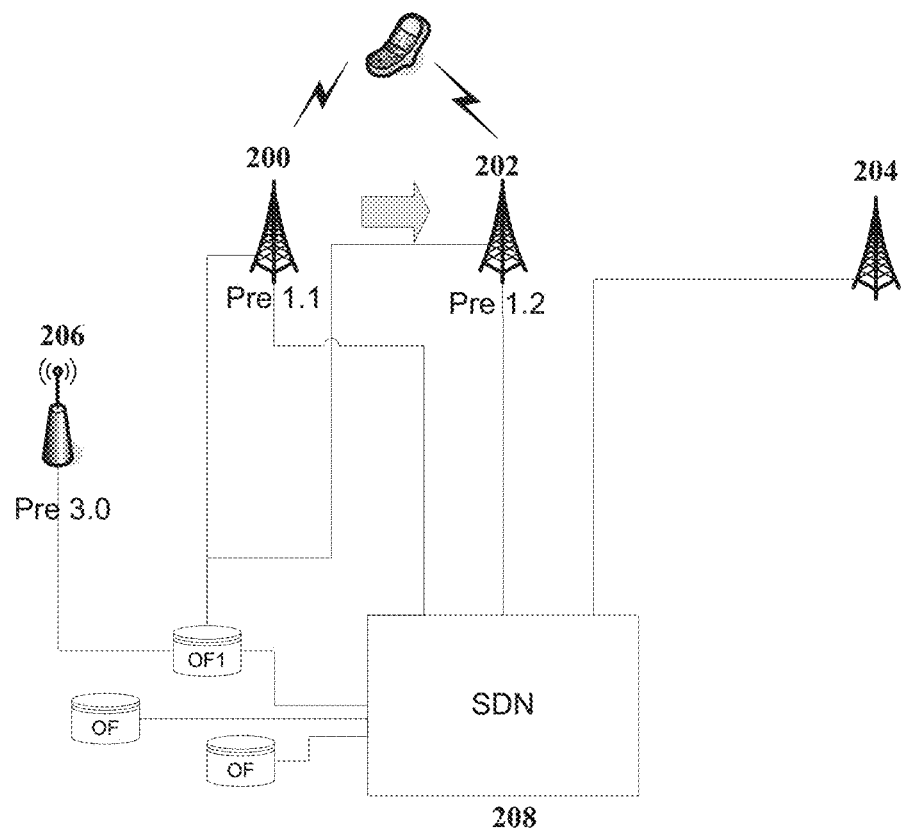
FIG. 2 illustrates a wireless network performing an intra-cellular handoff according to one or more embodiments.

Referring now to FIG. 2, illustrated is a wireless network performing an intra-cellular HO. A UE device 210 can include, but is not limited to, a meter reader, a mobile device, a tablet, etc. UE devices 210 can also be stationary or mobile and require mobility HO. In a cellular network, multiple network devices can exist including, but not limited to, cellular towers 200, 202, 204 and Wi-Fi access points 206 that can communicate with the UE devices 210.

Identification data can be sent, from cellular towers 200, 202, 204 and the Wi-Fi access points 206 to the UE devices 210. This identification data can include various IP prefixes corresponding to each cellular tower 200, 202, 204 and the Wi-Fi access point device 206. For instance, as indicated by FIG. 2, the cellular tower 200 can send a prefix 1.1, the cellular tower 202 can send a prefix 1.2, and the Wi-Fi device 206 can send a prefix 3.0. After the cellular towers or Wi-Fi access point devices have sent their respective identification data to the UE device 210, the UE device 210 can then append its own UE identifier address and create one or more new identifier addresses associated with each cellular tower 200, 202, 204 and/or Wi-Fi access point 206 for which it received identification data.

The new identifier address can then be forwarded to the SDN 208 for configuration of a forwarding table. Each SDN 208 can be associated with a network device or a set of network devices. The SDN 208 can facilitate session continuity by performing an immediate HO or soft HO between one network device and another network device. During the soft HO, the UE device 210 can have multiple IP addresses (locators), which can be sent to CNs.

For example, FIG. 2 represents an intra-cellular HO for mobility management. Initially, the EU device 210 is closer to the cellular tower 200 and can receive prefix data comprising 1.1 from the cellular tower 200. The EU device 210 can append its identifier data to the prefix 1.1 and send this information to the SDN 208. As the UE device 210 moves closer to the cellular tower 202 and farther from the cellular tower 200, the UE device 210 can also receive identification data from the cellular tower 202 comprising the prefix 1.2. The EU device 210 can append its identifier data to the prefix 1.2 and send this information to the SDN 208.

The SDN 208 can then perform an immediate HO where the SDN 208 prompts the UE device 210 to immediately stop communicating with the cellular tower 200, and the SDN 208 prompts the UE device 210 to continue communicating with cellular tower 202. Or the SDN 208 can perform a soft HO where the UE device 210 utilizes the cellular tower 200 and the cellular tower 202 until the UE device 210 no longer receives packet data from the cellular tower 200 after a certain time and/or the UE device 210 no longer hears a receiving address from the cellular tower 200.

Figure 3:
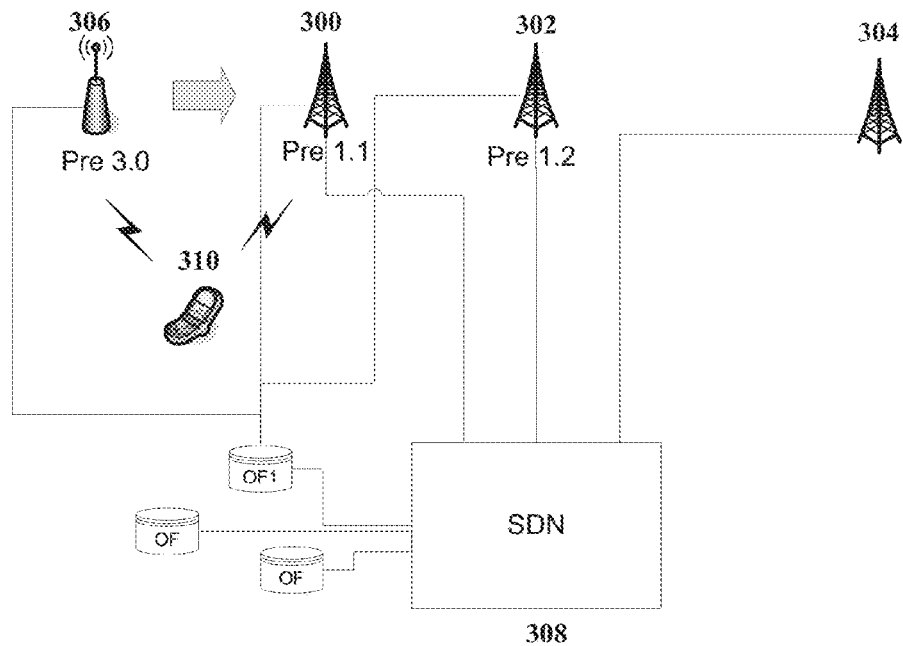
FIG. 3 illustrates a wireless network performing a Wi-Fi to cellular handoff according to one or more embodiments.

Referring now to FIG. 3, illustrated is wireless network performing a to cellular HO. A UE device 310 can include, but is not limited to, a meter reader, a mobile device, a tablet, etc. UE devices 310 can also be stationary or mobile and require mobility HO. In a cellular network, multiple network devices can exist including, but not limited to, cellular towers 300, 302, 304 and Wi-Fi access point device 306 that can communicate with the UE devices 310.

Identification data can be sent from the cellular towers 300, 302, 304 and Wi-Fi access points 306 to the UE devices 310. This identification data can include various IP prefixes corresponding to each cellular tower 300, 302, 304 and/or Wi-Fi access point device 306. For instance, as indicated by FIG. 3, the cellular tower 300 can send the prefix 1.1, the cellular tower 302 can send the prefix 1.2, and the Wi-Fi access point device 306 can send the prefix 3.0. After the cellular towers or Wi-Fi access point devices have sent their respective identification data to the UE device 310, the UE device 310 can then append its own UE identifier address and create one or more new identifier addresses associated with each cellular tower 300, 302, 304 and/or Wi-Fi access point device 306 for which it received identification data.

The new identifier address can then be forwarded to the SDN 308 for configuration of a forwarding table. Each SDN 308 can be associated with a network device or a set of network devices. The SDN 308 can facilitate session continuity by performing an immediate HO or soft HO between one network device and another network device. During the soft HO, the UE device 310 can have multiple IP addresses (locators), which can be sent to CNs.

For example, FIG. 3 represents a Wi-Fi to cellular HO for mobility management. Initially, the EU device 310 is closer to the Wi-Fi access point device 306 and can receive prefix data comprising 3.0 from the Wi-Fi access point device 306. The EU device 310 can append its identifier data to the prefix 3.0 and send this information to the SDN 308. As the UE device 310 moves closer to the cellular tower 300 and farther from the Wi-Fi access point device 306, the UE device 310 will also receive identification data from the cellular tower 300 comprising the prefix 1.1. The EU device 310 can append its identifier data to the prefix 1.1 and send this information to the SDN 308.

The SDN 308 can then perform an immediate HO where the SDN 308 prompts the UE device 310 to immediately stop communicating with the Wi-Fi access point device 306, and the SDN 308 prompts the UE device 310 to continue communicating with the cellular tower 300. Or the SDN 308 can perform a soft HO where the UE device 310 utilizes the Wi-Fi access point 306 and the cellular tower 300 until the UE device 310 no longer receives packet data from the Wi-Fi access point device 306 after a certain time and/or the UE device 310 no longer hears a receiving address from the Wi-Fi access point device 306.

Figure 4:
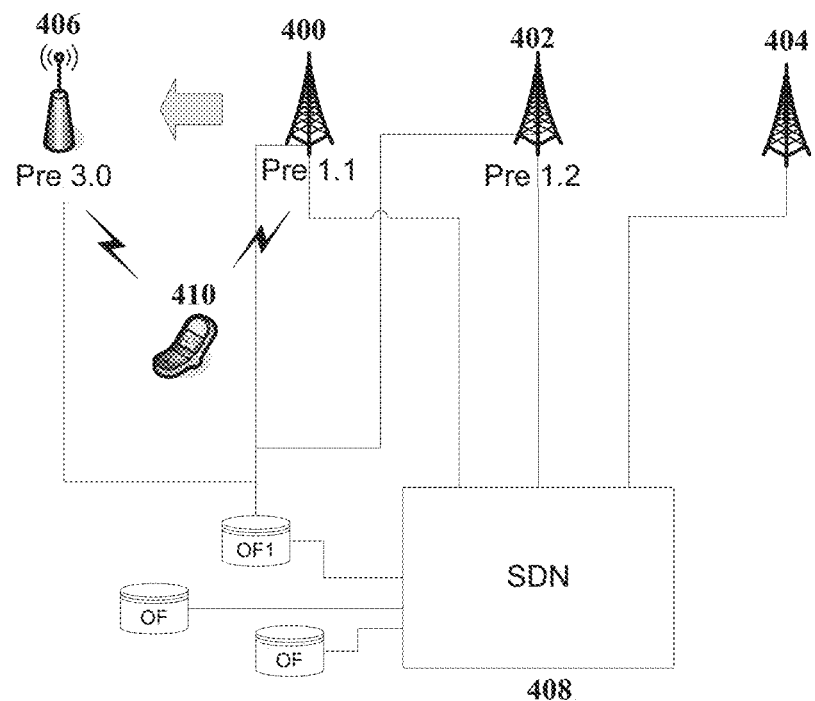
FIG. 4 illustrates a wireless network performing cellular to Wi-Fi handoff according to one or more embodiments.

Referring now to FIG. 4, illustrated is a wireless network performing cellular to Wi-Fi HO. A UE device 410 can include, but is not limited to, a meter reader, a mobile device, a tablet, etc. UE devices 410 can also be stationary or mobile and require mobility HO. In a cellular network, multiple network devices can exist including, but not limited to, cellular towers 400, 402, 404 and Wi-Fi access points 406 that can communicate with the UE device 410.

Identification data can be sent from cellular towers 400, 402, 404 and Wi-Fi access point devices 406 to the UE device 410. This identification data can include various IP prefixes corresponding to each cellular tower 400, 402, 404 and Wi-Fi access point device 406. For instance, as indicated by FIG. 4, the cellular tower 400 can send a prefix 1.1, the cellular tower 402 can send a prefix 1.2, and the Wi-Fi access point 406 can send a prefix 3.0. After the cellular towers 400, 402, 404 or Wi-Fi access points devices 406 have sent their respective identification data to the UE device 410, the UE device 410 can then append its own UP identifier address and create one or more new identifier addresses associated with each cellular tower 400, 402, 404 and/or Wi-Fi access point device 406 for which it received identification data.

The new identifier address can then be forwarded to the SDN 308 for configuration of a forwarding table. Each SDN 408 can be associated with a network device or a set of network devices. The SDN 408 can facilitate session continuity by performing an immediate HO or soft HO between one network device and another network device. During the soft HO, UE device 410 can have multiple IP addresses (locators), which can be sent to CNs.

For example, FIG. 4 represents a cellular to Wi-Fi HO for mobility management. Initially, the EU device 410 is closer to the cellular tower 400 and can receive prefix data comprising 1.1 from the cellular tower 400. The EU device 410 can append its identifier data to the prefix 1.1 and send this information to the SDN 408. As the UE device 410 moves closer to the Wi-Fi access point device 406 and farther from the cellular tower 400, the UE device 410 can also receive identification data from the Wi-Fi access point device 406 comprising the prefix 3.0. The EU device 410 can append its identifier data to the prefix 3.0 and send this information to the SDN 408.

The SDN 408 can then perform an immediate HO where the SDN 408 prompts the UE device 410 to immediately stop communicating with the cellular tower 400, and the SDN 408 prompts the UE device 410 to continue communicating with the Wi-Fi access point device 406. Or the SDN 408 can perform a soft HO where the UE device 410 utilizes the Wi-Fi access point device 406 and the cellular tower 400 until the UE device 410 no longer receives packet data from the cellular tower 400 after a certain time and/or the UE device 410 no longer hears a receiving address from the cellular tower 400.

Figure 5:
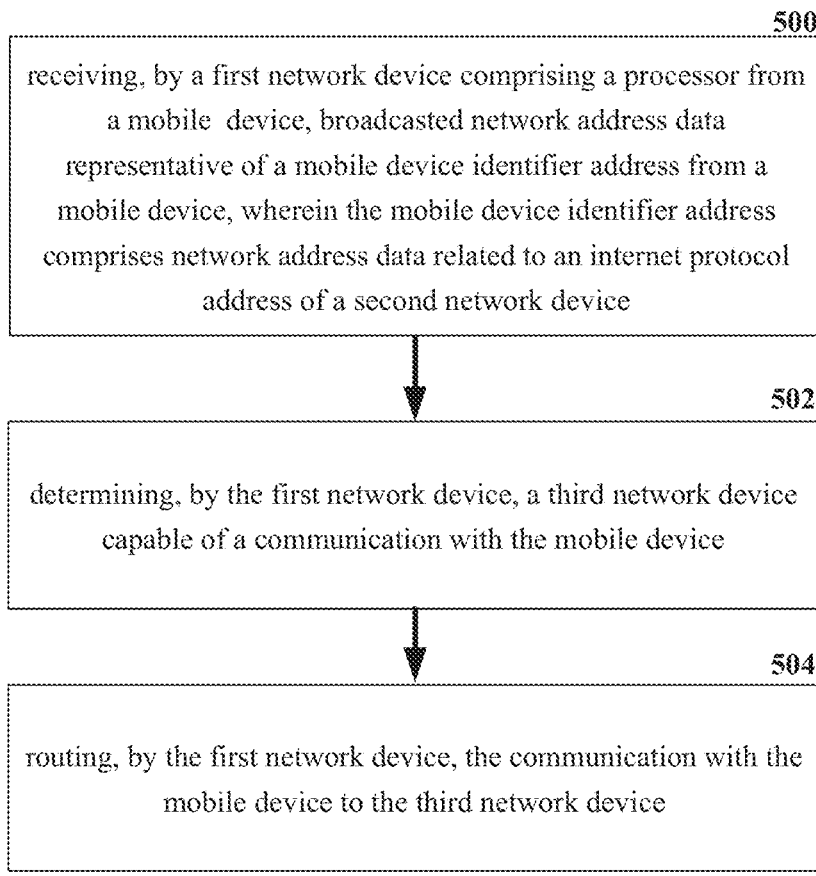
FIG. 5 illustrates a schematic system block diagram of a communication handoff between two network devices and the user equipment according to one or more embodiments.

Referring now to FIG. 5, illustrated is a schematic system block diagram of a communication HO between two network devices and the UE. A UE device can include, but is not limited to, a meter reader, a mobile device, a tablet, etc. UE devices can also be stationary or mobile and require mobility HO. In a cellular network, multiple network devices can exist including, but not limited to, cellular towers and Wi-Fi access points that can communicate with the UE device.

Identification data can be sent from the cellular towers and the Wi-Fi access points to the UE devices. This identification data can include various IP prefixes corresponding to each cellular tower and Wi-Fi access point device. After the cellular towers or access points have sent their respective identification data to the UE device, the UE device can then append its own UE identifier address and create one or more new identifier addresses associated with each cellular tower and/or Wi-Fi access point for which it received identification data.

The new identifier address can then be forwarded to the SDN for configuration of a forwarding table. Each SDN can be associated with a network device or a set of network devices. The SDN can facilitate session continuity by performing an immediate HO or soft HO between one network device and another network device. During the soft HO, the UE device can have multiple IP addresses (locators), which can be sent to CNs.

At element 500, broadcasted network address data representative of a mobile device identifier address can be received from a mobile device, wherein the mobile device identifier address can comprise network address data related to an Internet protocol address of a second network device. A third network device capable of a communication with the mobile device can be determined at element 502. The first network device can route the communication with the mobile device to the third network device at element 504.

Figure 6:
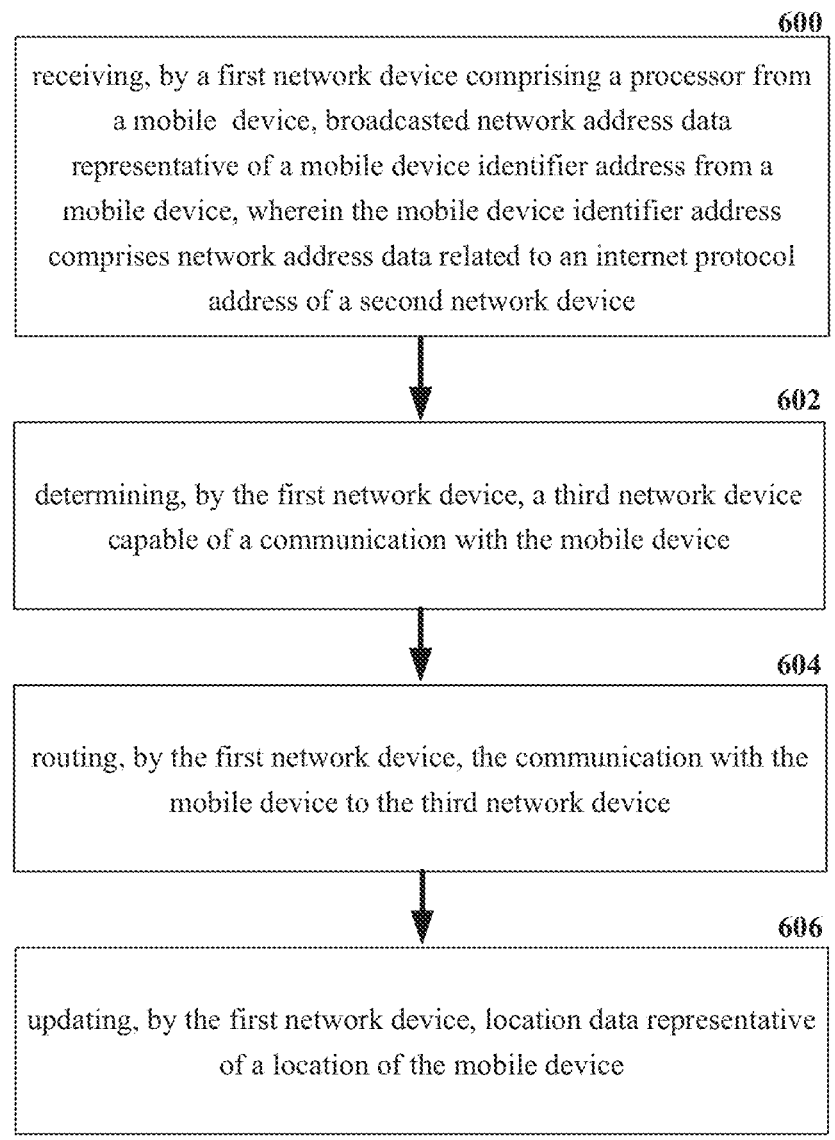
FIG. 6 illustrates a schematic system block diagram of a communication handoff between two network devices and user equipment while updating the user equipment location data according to one or more embodiments.

Referring now to FIG. 6, illustrated is schematic system block diagram of a communication HO between two network devices and the UE while updating UE location data. A UE device can include, but is not limited to, a meter reader, a mobile device, a tablet, etc. UE devices can also be stationary or mobile and require mobility HO. In a cellular network, multiple network devices can exist including, but not limited to, cellular towers and Wi-Fi access points that can communicate with the UE device.

Identification data can be sent from the cellular towers and the Wi-Fi access point devices to the UE devices. This identification data can include various IP prefixes corresponding to each cellular tower and Wi-Fi access point device. After the cellular towers or Wi-Fi access points have sent their respective identification data to the UE device, the UP device can then append its own UE identifier address and create one or more new identifier addresses associated with each cellular tower and/or Wi-Fi access point device for which it received identification data.

The new identifier address can then be forwarded to the SDN for configuration of a forwarding table. Each SDN can be associated with a network device or a set of network devices. The SDN can facilitate session continuity by performing an immediate HO or soft HO between one network device and another network device. During the soft HO, the UE device can have multiple IP addresses (locators), which can be sent to CNs.

At element 600, broadcasted network address data representative of a mobile device identifier address can be received from a mobile device, wherein the mobile device identifier address can comprise network address data related to an internet protocol address of a second network device. A third network device capable of a communication with the mobile device can be determined at element 602. The first network device can route the communication with the mobile device to the third network device at element 604. At element 606, the first network device can update the location data representative of a location of the mobile device.

Figure 7:
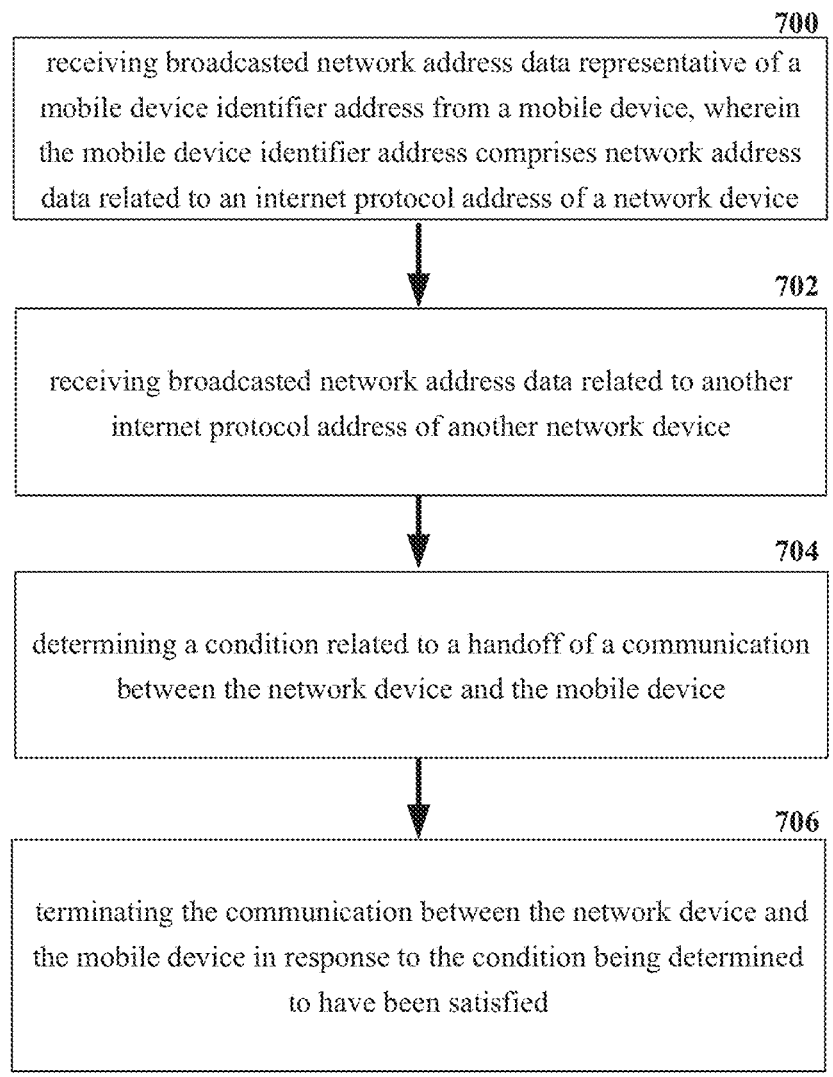
FIG. 7 illustrates a schematic system block diagram for a communication handoff between two network devices and the user equipment, determining a condition related to the handoff, and terminating communication with one of the network devices according to one or more embodiments.

Referring now to FIG. 7, illustrated is a schematic system block diagram for a communication HO between two network devices and the UE, determining a n condition related to the HO, and terminating communication with one of the network devices. A UE device can include, but is not limited to, a meter reader, a mobile device, a tablet, etc. UE devices can also be stationary or mobile and require mobility HO. In a cellular network, multiple network devices can exist including, but not limited to, cellular towers and Wi-Fi access points that can communicate with the UE device.

Identification data can be sent, from the cellular towers and the Wi-Fi access point devices to the UE devices. This identification data can include various IP prefixes corresponding to each cellular tower and Wi-Fi access point device. After the cellular towers or Wi-Fi access points have sent their respective identification data to the UE device, the UE device can then append its own UE identifier address and create one or more new identifier addresses associated with each cellular tower and/or Wi-Fi access point device for which it received identification data.

The new identifier address can then be forwarded to the SDN for configuration of a forwarding table. Each SDN can be associated with a network device or a set of network devices. The SDN can facilitate session continuity by performing an immediate HO or soft HO between one network device and another network device. During the soft HO, the UE device can have multiple IP addresses (locators), which can be sent to CNs.

At element 700, the system can receive broadcasted network address data representative of a mobile device identifier address from a mobile device, wherein the mobile device identifier address can comprise network address data related to an internet protocol address of a network device. The system of element 700 can receive broadcasted network address data related to another internet protocol address of another network device at element 702 and can determine a condition related to a handoff of a communication between the network device and the mobile device at element 704. The system can also terminate the communication between the network device and the mobile device in response to the condition being determined to have been satisfied at element 706.

Figure 8:
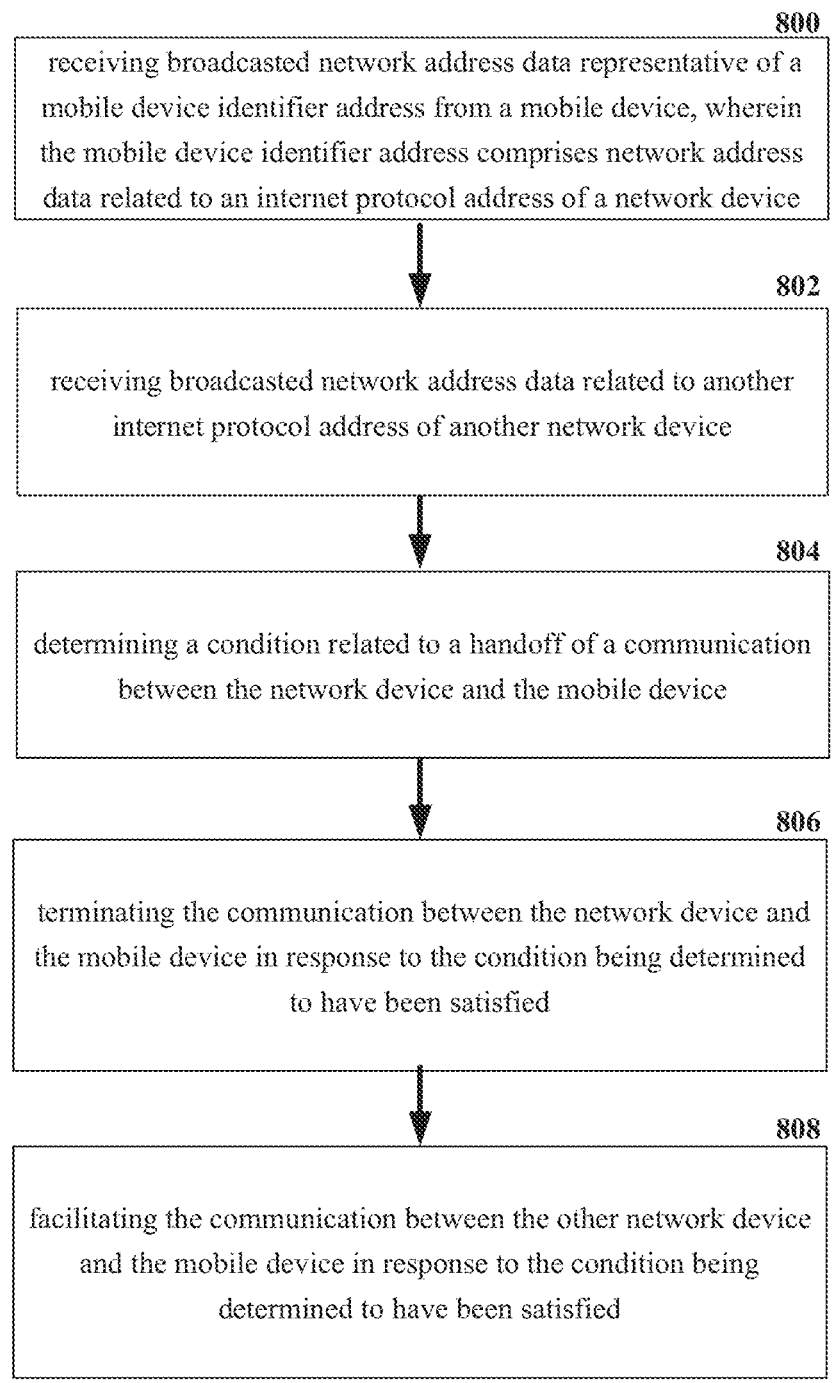
FIG. 8 illustrates a schematic system block diagram for a communication handoff between two network devices and the user equipment, determining a condition related to the handoff, terminating communication with one of the network devices, and facilitating communication with the other network device based on the condition being satisfied according to one or more embodiments.

Referring now to FIG. 8, illustrated is a schematic system block diagram for a communication HO between two network devices and the UE, determining a condition related to the HO, and terminating communication with one of the network devices and facilitating communication with the other network device based on the condition being satisfied. A UE device can include, but is not limited to, a meter reader, a mobile device, a tablet, etc. UE devices can also be stationary or mobile and require mobility HO. In a cellular network, multiple network devices can exist including, but not limited to, cellular towers and Wi-Fi access points that can communicate with the UE device.

Identification data can be sent from the cellular towers and the access point devices to the UE devices. This identification data can include various IP prefixes corresponding to each cellular tower and access point device. After the cellular towers or Wi-Fi access points devices have sent their respective identification data to the UE device, the UE device can then append its own UE identifier address and create one or more new identifier addresses associated with each cellular tower and/or Wi-Fi access point device for which it received identification data.

The new identifier address can then be forwarded to the SDN for configuration of a forwarding table. Each SDN can be associated with a network device or a set of network devices. The SDN can facilitate session continuity by performing an immediate HO or soft HO between one network device and another network device. During the soft HO, the UE device can have multiple IP addresses (locators), which can be sent to CNs.

At element 800, the system can receive broadcasted network address data representative of a mobile device identifier address from a mobile device, wherein the mobile device identifier address can comprise network address data related to an internet protocol address of a network device. The system of element 800 can receive broadcasted network address data related to another internet protocol address of another network device at element 802 and can determine a condition related to a handoff of a communication between the network device and the mobile device at element 804. The system can also terminate the communication between the network device and the mobile device in response to the condition being determined to have been satisfied at element 806. Furthermore, the system can facilitate communication between the other network device and the mobile device in response to the condition being determined to have been satisfied at element 808.

Figure 9:
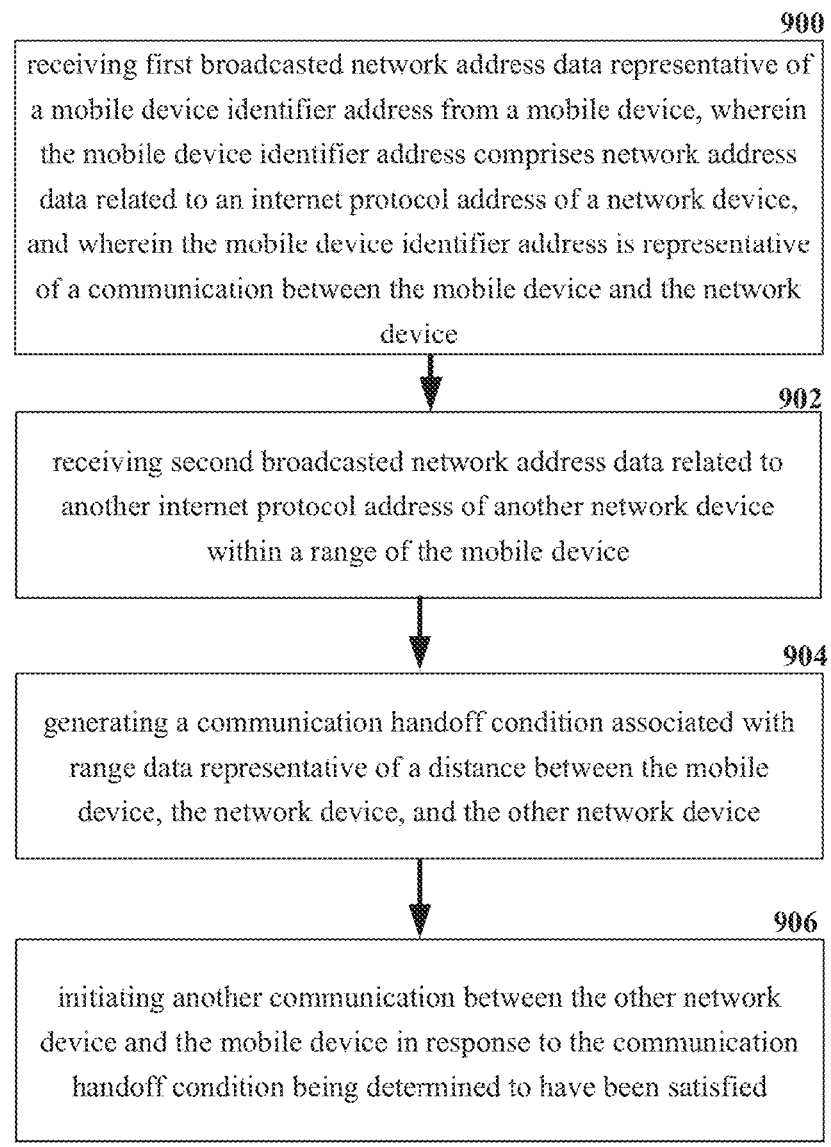
FIG. 9 illustrates a schematic system block diagram for receiving broadcasted network address data related to network devices and initiating a communication with a network device based on a communication handoff condition being satisfied according to one or more embodiments.

Referring now to FIG. 9, illustrated is a schematic system block diagram for receiving broadcasted network address data related to network devices and initiating a communication with a network device based on a communication HO condition being satisfied. A UE device can include, but is not limited to, a meter reader, a mobile device, a tablet, etc. UE devices can also be stationary or mobile and require mobility HO. In a cellular network, multiple network devices can exist including, but not limited to, cellular towers and Wi-Fi access points that can communicate with the UE device.

Identification data can be sent from the cellular towers and the Wi-Fi access point devices to the UE devices. This identification data can include various IP prefixes corresponding to each cellular tower and Wi-Fi access point device. After the cellular towers or Wi-Fi access point devices have sent their respective identification data to the UE device, the UE device can then append its own UE identifier address and create one or more new identifier addresses associated with each cellular tower and/or Wi-Fi access point device for which it received identification data.

The new identifier address can then be forwarded to the SDN for configuration of a forwarding table. Each SDN can be associated with a network device or a set of network devices. The SDN can facilitate session continuity by performing an immediate HO or soft HO between one network device and another network device. During the soft HO, the UE device can have multiple IP addresses (locators), which can be sent to CNs.

At element 900, the system can receive first broadcasted network address data representative of a mobile device identifier address from a mobile device, wherein the mobile device identifier address can comprise network address data related to an internet protocol address of a network device. The mobile device identifier address can be representative of a communication between the mobile device and the network device. At element 902, second broadcasted network address data related to another internet protocol address of another network device within a range of the mobile device can be received by the system. The system can also generate a communication handoff condition associated with range data representative of a distance between the mobile device, the network device, and the other network device at element 904. Moreover, the system can initiate another communication between the other network device and the mobile device in response to the communication handoff condition being determined to have been satisfied at element 906.

Figure 10:
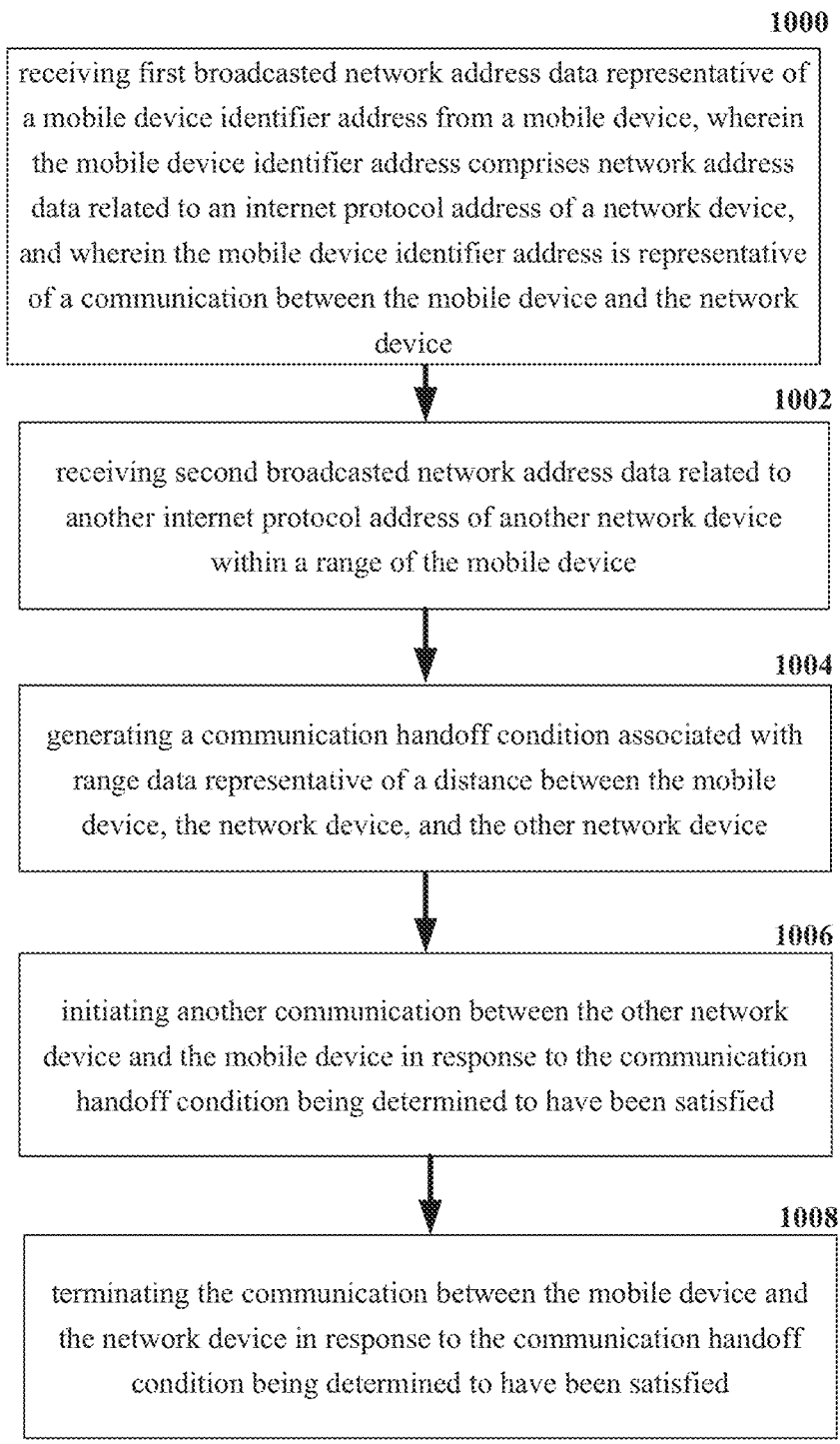
FIG. 10 illustrates a schematic system block diagram for receiving broadcasted network address data related to network devices and initiating a communication with a network device and terminating a communication with another network device based on a communication handoff condition being satisfied according to one or more embodiments.

Referring now to FIG. 10, illustrated is a schematic system block diagram for receiving broadcasted network address data related to network devices and initiating a communication with a network device and terminating a communication with another network device based on a communication HO condition being satisfied. A UE device can include, but is not limited to, a meter reader, a mobile device, a tablet, etc. UE devices can also be stationary or mobile and require mobility HO. In a cellular network, multiple network devices can exist including, but not limited to, cellular towers and Wi-Fi access points that can communicate with the UE device.

Identification data can be sent from the cellular towers and the access point devices to the UE devices. This identification data can include various IP prefixes corresponding to each cellular tower and Wi-Fi access point device. After the cellular towers or Wi-Fi access point devices have sent their respective identification data to the UE device, the UE device can then append its own UE identifier address and create one or more new identifier addresses associated with each cellular tower and/or Wi-Fi access point for which it received identification data.

The new identifier address can then be forwarded to the SDN for configuration of a forwarding table. Each SDN can be associated with a network device or a set of network devices. The SDN can facilitate session continuity by performing an immediate HO or soft HO between one network device and another network device. During the soft HO, the UE device can have multiple IP addresses (locators), which can be sent to CNs.

At element 900, the system can receive first broadcasted network address data representative of a mobile device identifier address from a mobile device, wherein the mobile device identifier address can comprise network address data related to an internet protocol address of a network device. The mobile device identifier address can be representative of a communication between the mobile device and the network device. At element 902, second broadcasted network address data related to another interact protocol address of another network device within a range of the mobile device can be received by the system. The system can also generate a communication handoff condition associated with range data representative of a distance between the mobile device, the network device, and the other network device at element 904. Moreover, the system can initiate another communication between the other network device and the mobile device in response to the communication handoff condition being determined to have been satisfied at element 906. Additionally, the communication between the mobile device and the network device, in response to the communication handoff condition being determined to have been satisfied, can be terminated at element 908.

Figure 11:
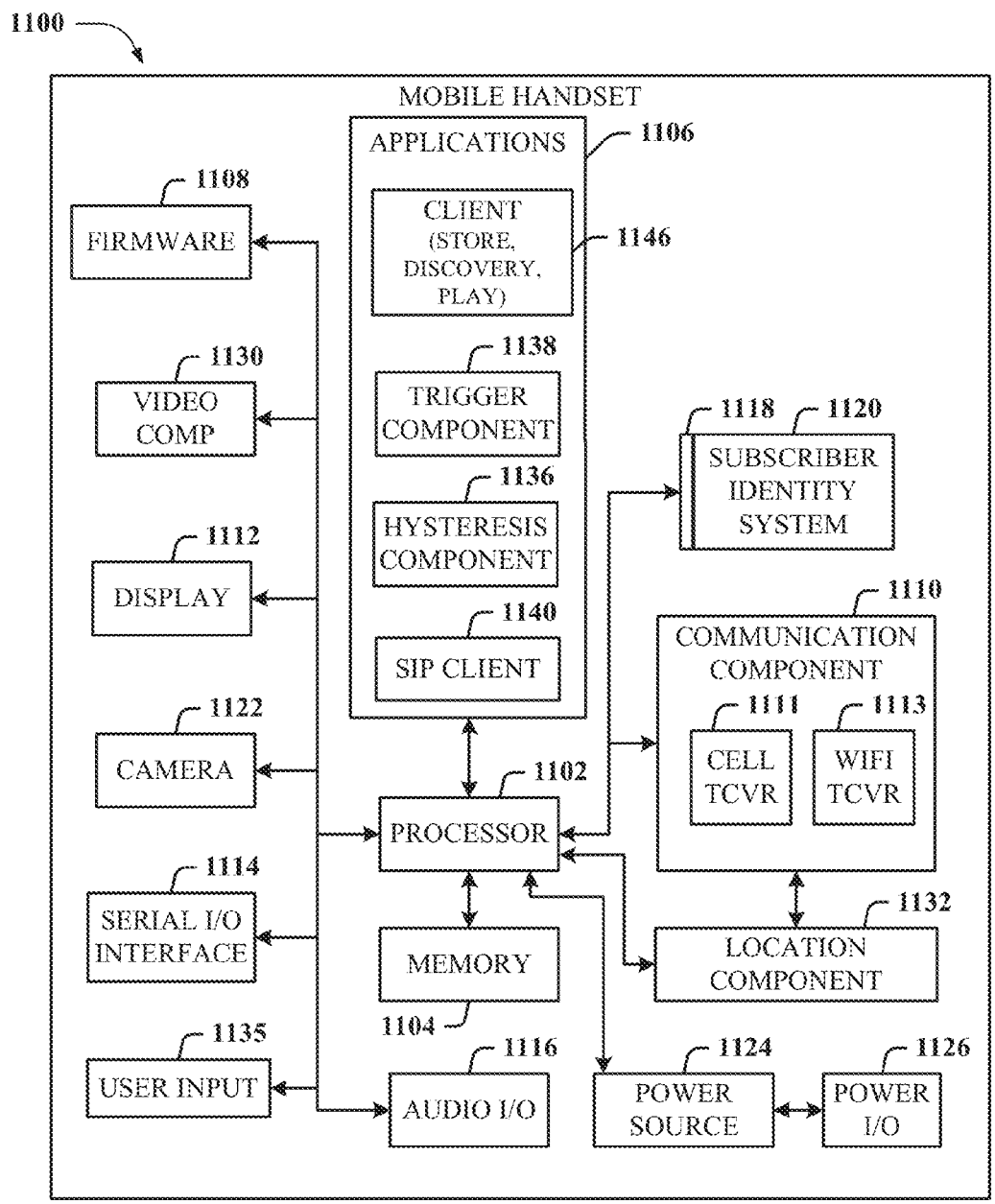
FIG. 11 illustrates a block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a computer readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a. GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discover, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
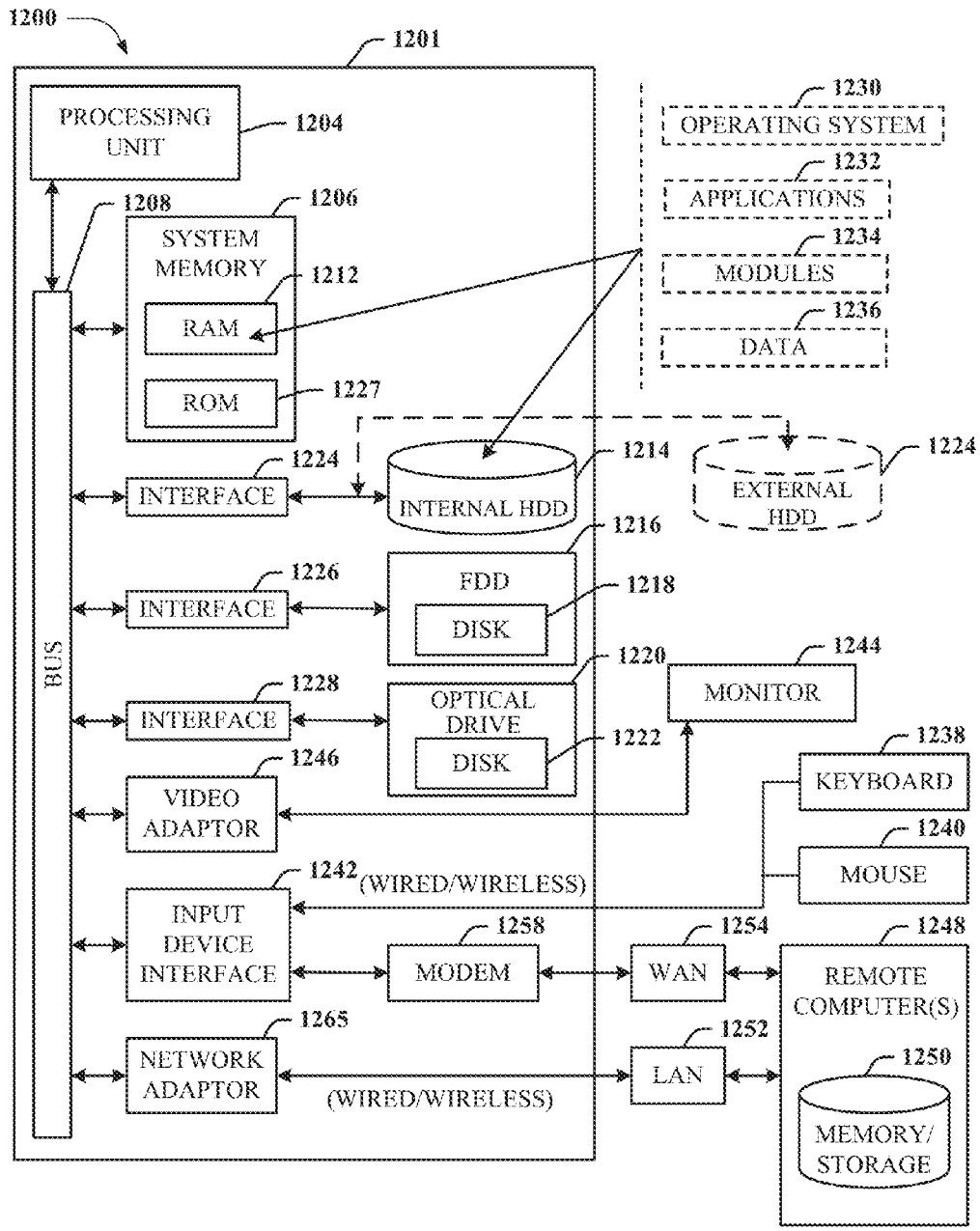
FIG. 12 illustrates a block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 121.4 can also be configured for external use in a suitable chassis (not shown), a magnetic floppy disk drive (FDD) 1216, to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1211 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the serial port interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   determining, by a software-defined network device comprising a processor, a first network device other than the software-defined network device;
   based on a change in speed of a mobile device, updating, by the software-defined network device, a mobility status associated with the mobile device, wherein the updating comprises updating a first speed of the mobile device in relation to the first network device and updating a second speed of the mobile device in relation to a second network device; and
   in response to the updating the mobility status and a condition associated with a distance of the mobile device to the first network device being satisfied,
      prompting, by the software-defined network device, the mobile device to communicate with the second network device, and
      routing, by the software-defined network device, a communication to the second network device to send to the mobile device.

2. The method of claim 1, further comprising:
   receiving, by the software-defined network device, from the mobile device, broadcasted network address data representative of an identifier address of the mobile device.

3. The method of claim 2, wherein the identifier address comprises network address data related to an internet protocol address of the first network device.

4. The method of claim 1, further comprising:
   based on the updating the mobility status, updating, by the software-defined network device, location data representative of a location of the mobile device.

5. The method of claim 1, further comprising:
   updating, by the software-defined network device, network address data associated with the second network device.

6. The method of claim 5, wherein the updating comprises removing network address data associated with the first network device.

7. The method of claim 5, wherein the updating comprises adding location data representative of a location of the mobile device.

8. A software-defined network device, comprising:
   a processor; and
   a memory that stores executable instructions that, when executed by the processor, facilitate performance of operations, comprising:
      determining a condition related to a handoff of a communication between a first network device and a mobile device has been satisfied, wherein the condition is related to a first range of the mobile device in relation to the first network device and a second range of the mobile device in relation to a second network device;
      generating first speed data associated with a first speed of the mobile device in relation to the first network device;
      generating second speed data associated with a second speed of the mobile device in relation to the second network device; and
      in response to the determining the condition has been satisfied and based on the first speed data, and the second speed data, terminating the communication between the first network device and the mobile device.

9. The software-defined network device of claim 8, wherein the operations further comprise:
   receiving broadcasted network address data representative of a mobile device identifier address from the mobile device.

10. The software-defined network device of claim 9, wherein the mobile device identifier address comprises network address data related to a first internet protocol address of the first network device.

11. The software-defined network device of claim 10, wherein the operations further comprise:
    receiving broadcasted network address data related to a second internet protocol address of the second network device.

12. The software-defined network device of claim 11, wherein the operations further comprise:
    in response to the receiving the broadcasted network address data, updating the network address data related to the second network device.

13. The software-defined network device of claim 12, wherein the updating comprises adding the network address data to a data structure associated with the second network device.

14. The software-defined network device of claim 8, wherein the operations further comprise:
    in response to the determining the condition has been satisfied, updating mobility status data associated with the second speed of the mobile device in relation to the second network device.

15. A non-transitory machine-readable medium, comprising executable instructions that, when executed by a processor of a software-defined networking device, facilitate performance of operations, comprising:
- receiving first speed data associated with a first speed of a mobile device in relation to a first network device;
- receiving second speed data associated with a second speed, different from the first speed, of the mobile device in relation to a second network device;
- generating a communication transfer condition associated with range data representative of a distance between the mobile device, the first network device, and the second network device; and
- in response to the receiving the first speed data, the second speed data, and the communication transfer condition being determined to have been satisfied, initiating a first communication between the second network device and the mobile device, and terminating a second communication between the mobile device and the first network device.

16. The non-transitory machine-readable medium of claim 15, wherein the operations further comprise:
- updating mobile device address data associated with the first communication between the second network device and the mobile device.

17. The non-transitory machine-readable medium of claim 16, wherein the updating comprises updating mobile device location data with the range data of the mobile device.

18. The non-transitory machine-readable medium of claim 17, wherein the operations further comprise:
- receiving first broadcasted network address data representative of a mobile device identifier address from the mobile device.

19. The non-transitory machine-readable medium of claim 15, wherein a mobile device identifier address associated with the mobile device comprises network address data related to a first internet protocol address of the first network device.

20. The non-transitory machine-readable medium of claim 19, wherein the operations further comprise:
- in response to the communication transfer condition being determined to have been satisfied, deleting the network address data related to the first internet protocol address of the first network device.

* * * * *